(No Model.)
G. W. ARNOLD.
HAY PRESS.
No. 465,772.　　　　　　　　Patented Dec. 22, 1891.
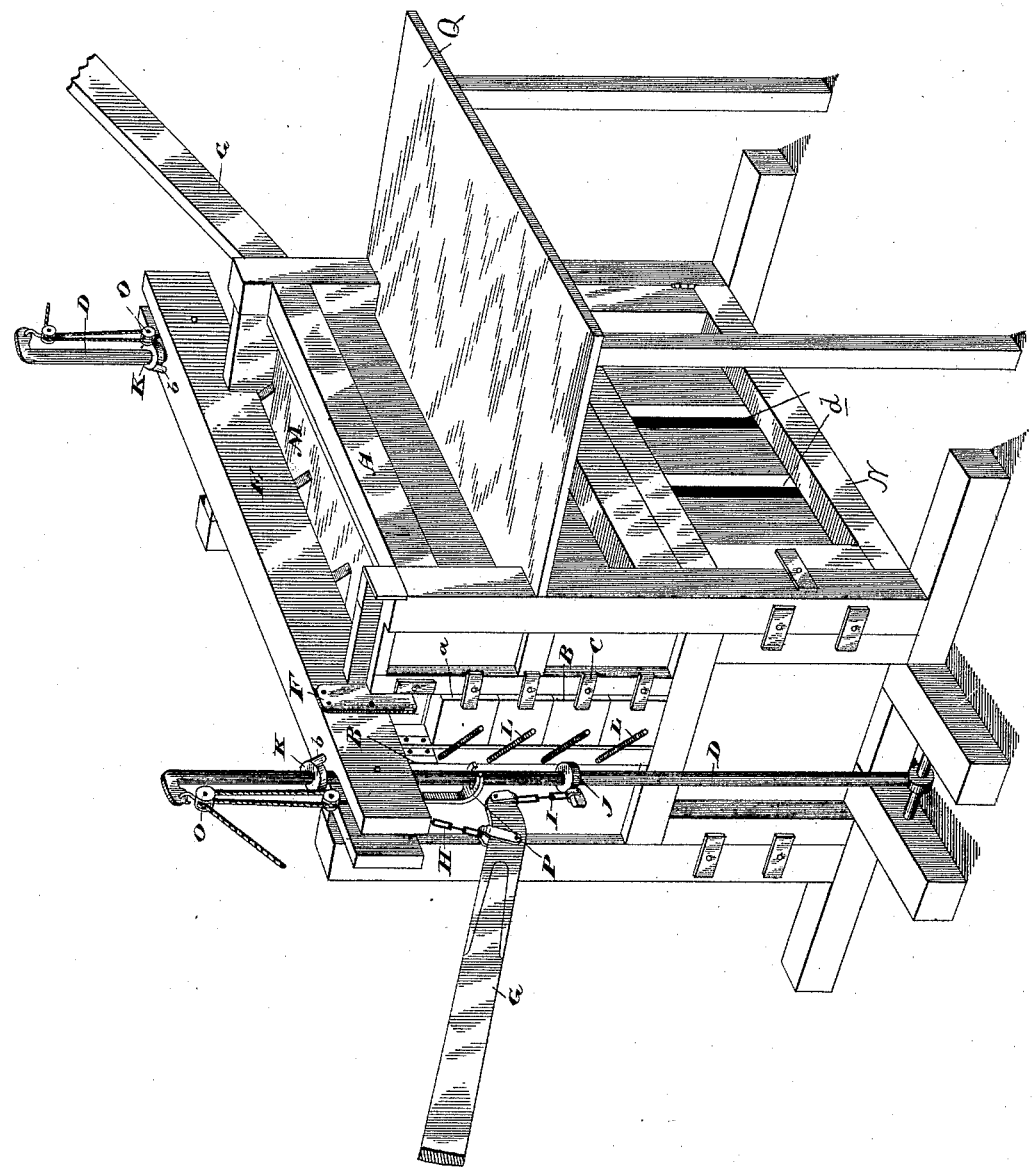
Witnesses.　　　　　　　　Inventor.

UNITED STATES PATENT OFFICE.

GEORGE W. ARNOLD, OF TORONTO, CANADA.

HAY-PRESS.

SPECIFICATION forming part of Letters Patent No. 465,772, dated December 22, 1891.

Application filed June 25, 1890. Serial No. 356,694. (No model.) Patented in Canada March 26, 1890, No. 33,989.

*To all whom it may concern:*

Be it known that I, GEORGE WASHINGTON ARNOLD, of the city of Toronto, in the county of York, in the Province of Ontario, Canada, have invented a certain new and Improved Hay-Press, (for which I have obtained Canadian Letters Patent No. 33,989, dated March 26, 1890,) of which the following is a specification.

The object of this invention is to improve the practical working of the press shown in my patent, No. 421,472, of February 18, 1890; and the invention consists in the peculiar construction, arrangement, and combinations of parts hereinafter more particularly described, and then definitely claimed.

The drawing represents a perspective view of my improved press as it will appear in operation.

A represents a strong frame or press-body, in which the bale is compressed. A narrow vertical opening is left in each end of the said body, each opening being closed by a series of narrow boards or blocks B, which are independently hinged and locked by button C. Opposite to each of the openings thus closed I place a vertical rod D, and connect the two rods together by a cross-head E, which is fitted loosely on the said rods. Two plates F, only one of which is shown, are fixed to the cross-head E, and their ends are shaped so as to fit into vertical grooves $a$, made in the frame of the machine. A lever G is connected at each end of the cross-head E by a chain H, and also by a chain I to an arm or projection formed on the sleeve J, which is movably fitted onto the rod D, the said chains being connected to the lever at different points, so that one chain shall act as a fulcrum for the other. On each rod D, immediately above the cross-head E, I place a sleeve K with an arm or projection $b$, which rests upon the top of the cross-head, as indicated.

Springs L are placed as shown or on the hinges of the blocks, so as to open them when not buttoned.

Having now described the general construction of the machine, I shall proceed to explain, briefly, its operation.

The forked arm P, connected to the cross-head E, is brought below the sleeve J, so as to prevent it canting, and the cross-head E is raised up to the top of the rod D by the pulleys O, when the said cross-head E, with the follower M, which is attached to it, may be pushed on one side, the rods D being pivoted. The press is then filled with hay and the cross-head E, with the follower M, is brought back until the rods D are in a vertical position. The plates F are then inserted in the grooves $a$, and the follower laid on the top of the hay. The forked arms are then moved clear of the sleeves J, and the levers G are worked in the ordinary way, and, owing to the connection between the levers G, through the chains H and I, with the cross-head E and vertical rods D, each downward movement of the levers will draw down the cross-head E, compressing the hay into the frame A in proportion to the said movement. As the cross-head is thus moved down, the sleeves K, resting on top of it, slide down the rods. When the levers G are raised to secure a fresh grip, the expansion of the hay in the press pushes the cross-head E upwardly; but as this upward pressure on the cross-head E acts against the arms or projections $b$ on the sleeves K the said sleeves are tilted so as to cause them to grip their respective rods, thus holding the cross-head E stationary. The upward movement of the levers G also loosens the tension on the chains, permitting the sleeve J to slide down their respective rods, where they take a fresh grip when the levers G are once more pressed down. In this way each downward movement of the levers compresses the hay into the frame A and each upward movement moves the fulcrums of the levers downwardly. In this manner the hay is gradually compressed into a bale of the required size. As the narrow blocks or boards B would interfere with the downward movement of the cross-head E, I arrange the buttons C so that they will lie across the path of the plates F. As the cross-head E is forced down, as described, the ends of the plate F, coming in contact with the buttons C, turn the said buttons on their respective pivots so as to move them clear of the ends of the narrow boards or blocks B, which they hold in position, thus leaving the respective blocks free to be pushed open on their hinges by the action of the springs L. In this way the narrow blocks or boards B are opened in pairs to make room for the downward movement of the cross-head E, and the whole operation is accomplished automatically, as described, by the mere upward and downward movements of the levers G. When the hay is compressed into the bale of the desired size, the binding-wires are slipped through the grooves $d$ and the bale tied together in the ordinary way, when the door N may be opened and the bale withdrawn.

A table Q is placed on the side of the frame on which the packer stands.

What I claim as my invention is—

1. In a press, the vertical rods D, a cross-head E, loosely fitted thereon, the sleeves also loosely fitted on said rods and so that their arms or projections $b$ shall rest on top of said cross-head E, in combination with the levers G, chains H and I, sleeves J, and forked arm P, substantially as and for the purpose specified.

2. In a press, the vertical rods D, a cross-head E, loosely fitted thereon, the sleeves K, also loosely fitted on said rods and so that their arms or projections $b$ shall rest on top of the cross-head E, the press-body having a narrow vertical opening in each end, a series of independent boards or blocks B, closing in and hinged to the walls of said openings and leaving a vertical groove $a$ between the ends of the blocks B and the adjacent walls of the openings, the plates F, fixed to the cross-head E and having their ends passing between the boards B and one of the walls of the opening, the pivoted buttons C, extending across their respective vertical grooves $a$ when holding said boards or blocks B in position, in combination with the levers G, chains H and I, and sleeves J, arranged substantially as and for the purpose specified.

3. In a press, the vertical rods D, a cross-head E, loosely fitted thereon, the sleeves K, also loosely fitted on said rods and so that their arms or projections $b$ shall rest on top of the cross-head E, the press-body having a narrow vertical opening in each end, a series of independent boards or blocks B, closing in and hinged to the walls of said openings and leaving a vertical groove $a$ between the ends of the blocks B and the adjacent walls of the openings, the plates F, fixed to the cross-head E and having their ends passing between the boards B and one of the walls of the opening, the pivoted buttons extending across their respective vertical grooves $a$ when holding the boards or blocks B closed, the springs L, arranged to open said boards or blocks B, in combination with the levers G, chains H and I, and sleeves J, arranged substantially as and for the purpose specified.

Toronto, May 29, 1890.

GEORGE W. ARNOLD.

In presence of—
CHARLES C. BALDWIN,
J. EDW. MAYBEE.